United States Patent
Suzuki et al.

(10) Patent No.: US 7,231,763 B2
(45) Date of Patent: Jun. 19, 2007

(54) HYDRAULIC APPARATUS

(75) Inventors: Shigeru Suzuki, Tokyo (JP); Satoru Shimada, Tokyo (JP); Takahiro Yamano, Tokyo (JP); Sumiko Seki, Yokohama (JP); Takahiko Itoh, Yokohama (JP)

(73) Assignees: Saxa, Inc., Tokyo (JP); Yukigaya Institute Co., Ltd., Kanagawa (JP)

( * ) Notice: Subject to any disclaimer, the term of this patent is extended or adjusted under 35 U.S.C. 154(b) by 0 days.

(21) Appl. No.: 10/531,426

(22) PCT Filed: Oct. 17, 2003

(86) PCT No.: PCT/JP03/13324

§ 371 (c)(1),
(2), (4) Date: Oct. 4, 2005

(87) PCT Pub. No.: WO2004/036056

PCT Pub. Date: Apr. 29, 2004

(65) Prior Publication Data
US 2006/0117745 A1 Jun. 8, 2006

(30) Foreign Application Priority Data
Oct. 18, 2002 (JP) .............................. 2002-304693

(51) Int. Cl.
*F16D 31/02* (2006.01)
(52) U.S. Cl. .............................. 60/413; 60/466; 60/468
(58) Field of Classification Search .................. 60/413, 60/414, 466, 468, 494
See application file for complete search history.

(56) References Cited

FOREIGN PATENT DOCUMENTS

| | | |
|---|---|---|
| JP | 53-036004 | 4/1978 |
| JP | 53-036005 | 4/1978 |
| JP | 60-121503 U | 8/1985 |
| JP | 60-159464 | 8/1985 |
| JP | 06-287952 | 10/1994 |
| JP | 2003-130006 | 5/2003 |
| WO | WO 84/03127 | 8/1984 |
| WO | WO 03/361000 | 5/2003 |

OTHER PUBLICATIONS

Takahiko Itoh et al. "The new theory and technology for hydraulic transmission," *The Japan Society of Mechanical Engineers Kanto Shibu*, Sep. 2002, pp. 243-244.

*Primary Examiner*—Michael Leslie
(74) *Attorney, Agent, or Firm*—Morgan, Lewis & Bockius LLP (57) ABSTRACT

A hydraulic system 10 of the present invention has a hydraulic pump driven by a driving source 14, a hydraulic pump motor 52 driven by an operating oil discharged from the hydraulic pump and flowing in an oil path 50, an inertial body 60 connected to a rotary shaft of the hydraulic pump motor, an oil path 62 connected between an outlet port of the hydraulic pump motor and a load 22, an unloading oil path 64 branched from the oil path 62, and an on-off valve 68 inserted in the unloading oil path. In this configuration, as the on-off valve is opened and closed, a high pressure is generated in the oil path 62 by making use of kinetic energy of the inertial body. The inertial body is driven by hydraulic power and the inertial body is separated from the driving source, which also provides an effect of increasing degrees of freedom for an instrument layout.

3 Claims, 5 Drawing Sheets

Fig.1

PRIOR ART

HYDRAULIC APPARATUS

TECHNICAL FIELD

The present invention relates to a hydraulic system capable of extracting a hydraulic power greater than that generated by an oil pressure source.

BACKGROUND ART

Examples of the hydraulic systems of the above type include those disclosed, for example, in Japanese Patent Applications Laid-Open No. 6-287952 and Laid-Open No. 2003-130006.

The hydraulic system disclosed in Japanese Patent Application Laid-Open No. 6-287952 relates to a press-in pile driver and is characterized in that an unloading oil path is branched from an oil path between a hydraulic pump as an oil pressure source and a hydraulic cylinder as a load and an on-off valve is inserted in the unloading oil path. The Application Laid-Open No. 6-287952 describes that in this configuration the on-off valve is instantly opened and closed to apply an oil impact to an operating oil flowing from the hydraulic pump to the hydraulic cylinder, whereupon the pressure of the operating oil can be made higher than the discharge pressure from the hydraulic pump. However, the hydraulic system making use of the oil impact causes a considerable loss and has a limit to increase of pressure, and thus it is considered not to be practical.

Figure 1:
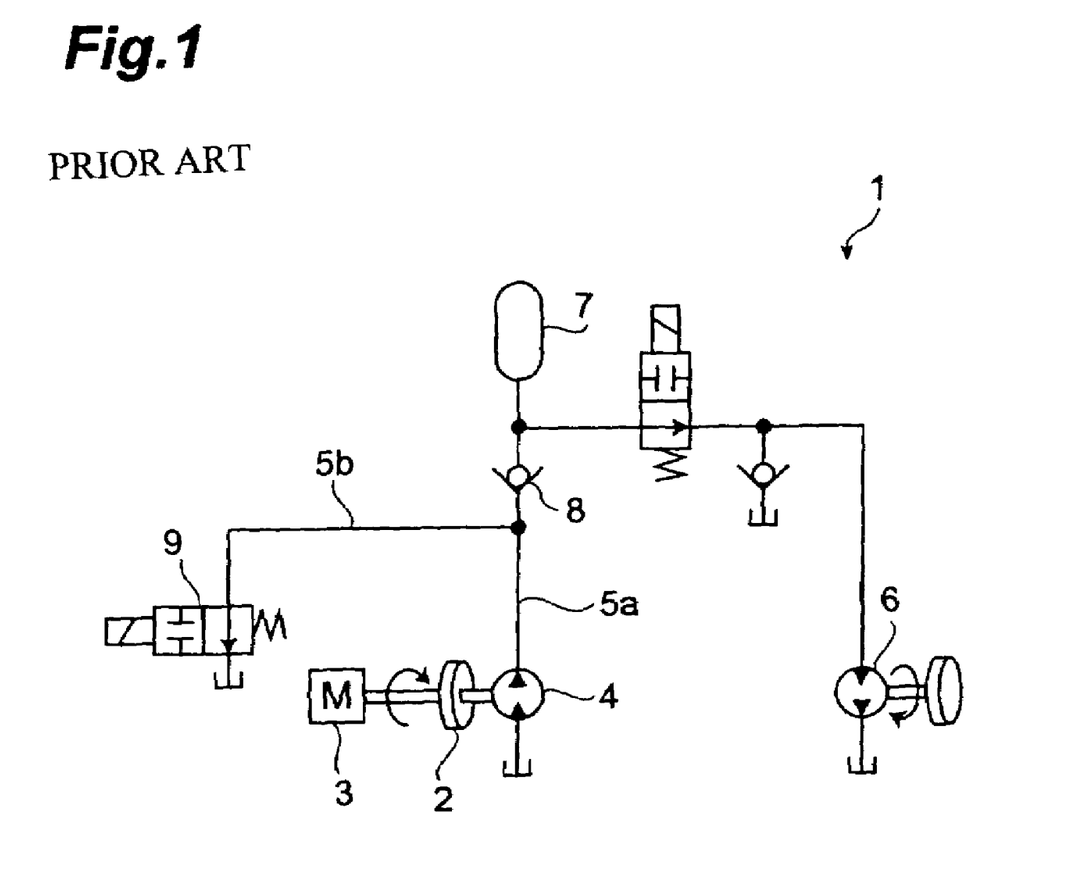
FIG. 1 is a hydraulic circuit diagram showing a configuration of a conventional hydraulic system.

In contrast to it, the hydraulic system disclosed in the Application Laid-Open No. 2003-130006 is not one making use of the oil impact but is configured to utilize energy storage in an inertial body. As schematically shown in FIG. 1, the hydraulic system 1 described in Laid-Open No. 2003-130006 has a hydraulic pump 4 driven by a driving source 3 having an inertial body 2 like a flywheel, and a load, e.g., a hydraulic motor 6 to which the operating oil discharged from the hydraulic pump 4 is supplied through an oil path 5a. An accumulator 7 is connected to the oil path 5a and a check valve 8 is inserted in the oil path 5a between the accumulator 7 and the hydraulic pump 4. Furthermore, an unloading oil path 5b is branched from the oil path 5a between the check valve 8 and the hydraulic pump 4, and an on-off valve 9 is inserted therein.

In the hydraulic system 1 of this configuration, in a state in which, while the on-off valve 9 is kept open, the hydraulic pump 4 is driven by the driving source 3 and the operating oil is circulated from the oil path 5a via the unloading oil path 5b, the outlet port of the hydraulic pump 4 is in an unloaded condition, and thus the energy outputted from the driving source 3 is stored up as kinetic energy $(1/2) \cdot I \cdot \omega^2$ of the inertial body 2, excluding losses in the hydraulic circuit system, the mechanical system, and so on. Here I is the moment of inertia of the inertial body 2, and $\omega$ the angular velocity of the inertial body 2. When the on-off valve 9 is closed at this moment, the operating oil discharged from the hydraulic pump 4 is supplied via the check valve 8 to the load 6; even if the magnitude of the load pressure after the check valve 8 is larger than a pressure of the operating oil that can be discharged from the hydraulic pump 4 driven by a drive torque (Qm) as a potential output of the driving source 3, the operating oil can be supplied at a greater pressure to the load 6 by virtue of a torque resulting from addition of a torque from the kinetic energy of the inertial body 2 preliminarily having stored the energy, to the drive torque (Qm) of the driving source 3, i.e., a torque (Qp) to drive the hydraulic pump 4.

As described above, the hydraulic system 1 disclosed in Laid-Open No. 2003-130006 provides the excellent effect of capability of supplying the operating oil at the higher pressure to the load 6, but also has a problem that usage and application ranges are limited.

For example, there are cases where the distance between the driving source 3 and the on-off valve 9 becomes very long because of an instrument layout. If the range between the driving source 3 and the on-off valve 9 is arranged variable, the oil paths 5a, 5b between the driving source 3 and the on-off valve 9 cannot be constructed of pipes with high rigidity such as steel pipes, but are replaced with rubber hoses or the like in some cases. In such cases, the rubber hoses or the like expand and contract to lower efficiency, and it is difficult to adopt the hydraulic system 1. In addition, in cases where there are a plurality of loads 6 and desires for individual control of the loads, it is necessary to prepare a plurality of hydraulic systems 1 and it is difficult to reduce the number of parts by common use of components.

An object of the present invention is therefore to provide a hydraulic system making use of the energy storage in an inertial body, which can be widely used in a variety of applications and fields.

DISCLOSURE OF THE INVENTION

In order to achieve the above object, Inventors conducted elaborate research and came to note that the hydraulic system described in Laid-Open No. 2003-130006 was constructed by handling the driving source, the inertial body, and the hydraulic pump as an integral part and by implementing the energy storage in the inertial body by mechanical power from the driving source. Then the Inventors came to discover separating the driving source from the inertial body. Namely, the present invention is a hydraulic system for supplying an operating oil to a predetermined load, which comprises an oil pressure source capable of outputting a predetermined hydraulic power, a first oil path one end of which is connected to the oil pressure source, a hydraulic pump motor having an inlet port to which the other end of the first oil path is connected, an inertial body connected to a rotary shaft of the hydraulic pump motor, a second oil path one end of which is connected to an outlet port of the hydraulic pump motor, an unloading oil path branched from the second oil path, an on-off valve inserted in the unloading oil path, a valve for preventing backflow of the operating oil to the unloading oil path, which is connected to the other end of the second oil path, and a third oil path extending from the valve and connected to the load.

In this configuration, the hydraulic pump motor is driven by the hydraulic power outputted from the oil pressure source. This results in rotating the rotary shaft of the hydraulic pump motor and also rotating the inertial body connected to the hydraulic pump motor (the inertial body encompasses an external inertial body like a flywheel and also encompasses an internal inertial body like a rotor of the hydraulic pump motor itself) to store the kinetic energy.

When the on-off valve is closed, even if the load pressure downstream of the check valve is higher than the discharge pressure of the oil pressure source, the energy of the inertial body is released with decrease in the angular velocity thereof, whereby the hydraulic pump motor can output a pressure higher than the load pressure downstream of the check valve.

The on-off valve can be effectively opened and closed by use of a controller for controlling the on-off valve, which is comprised of a microcomputer or the like.

A typical example of the oil pressure source is considered to be a hydraulic pump driven by a driving source. In this case, where the distance has to be set long between the driving source and the on-off valve, the hydraulic pump motor, the on-off valve, and the check valve can be located close to each other. Accordingly, the second oil path can be made drastically shorter than the first oil path. This effect will be detailed below.

Furthermore, since the hydraulic pump motor is driven by the hydraulic power from the oil pressure source to store the energy in the inertial body, only one oil pressure source can be shared even in a case where a plurality of loads are provided and where for each load there are provided a hydraulic pump motor, an inertial body, a second oil path, an unloading oil path, an on-off valve, a valve for prevention of backflow, and a third oil path. Namely, the operating oil from the oil pressure source can be distributed through branch pipes branched from the first oil path, to the respective hydraulic pump motors, so as to enable independent control of the individual loads.

Furthermore, the hydraulic system of the present invention preferably comprises an accumulator connected to the third oil path. The reason is that it becomes feasible to store and utilize the generated high pressure in the accumulator.

The above object and other features and advantages of the present invention will become apparent to those skilled in the art in view of the following detailed description with reference to the accompanying drawings.

BEST MODE FOR CARRYING OUT THE INVENTION

Preferred embodiments of the present invention will be described below in detail with reference to the drawings. Identical or equivalent portions will be denoted by the same reference symbols throughout the drawings, without redundant description.

Figure 2:
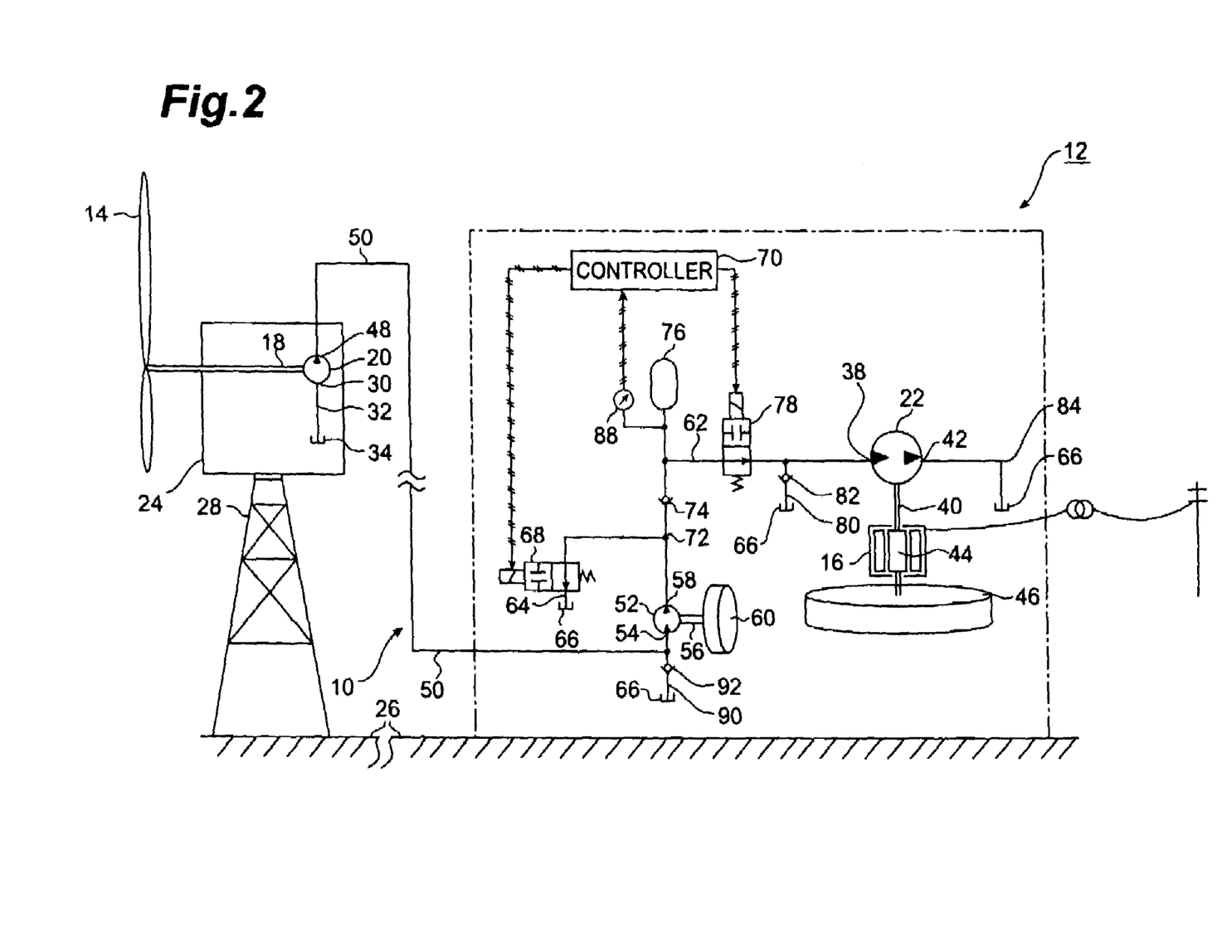
FIG. 2 is a hydraulic circuit diagram schematically showing a wind power generator to which a hydraulic system according to the present invention is applied.

FIG. 2 is a schematic illustration showing a wind power generator 12 to which a hydraulic system 10 according to the present invention is applied. The represented wind power generator 12 uses a propeller type windmill (driving source) 14 and is arranged to once convert a mechanical power generated with rotation of the windmill 14 by wind, to a hydraulic power and to thereafter convert this hydraulic power again to a mechanical power so as to rotate a rotary shaft of electric generator 16. For that purpose, the hydraulic system 10 in the represented wind power generator 12 is provided with a hydraulic pump 20 for converting the mechanical power to the hydraulic power, a rotary shaft 18 of which is connected to the windmill 14, and a hydraulic pump motor (load) 22 for converting the hydraulic power to the mechanical power.

The hydraulic pump 20 is of a constant-volume one-directional rotation type and constitutes an oil pressure source for generating the hydraulic power in collaboration with the windmill 14. The rotary shaft 18 of the hydraulic pump 20 is rotatably supported by bearings (not shown) provided in nacelle 24, and the hydraulic pump 20 is placed in this nacelle 24. The nacelle 24 is a box rotatably supported on an upper part of support 28 standing on foundation 26 such as the earth. An inlet port 30 of the hydraulic pump 20 is communicated through an oil path 32 with an oil tank 34 placed in the nacelle 24.

The hydraulic pump motor 22 is of the constant-volume one-directional rotation type, and is arranged to rotate its rotary shaft 40 under feed of the operating oil through its inlet port 38, to suck in the operating oil through the inlet port 38 with rotation of the rotary shaft 40, and to discharge the operating oil from its outlet port 42. The rotary shaft 40 of the hydraulic pump motor 22 is connected to a rotor 44 of the electric generator 16.

The rotor 44 of the electric generator 16 is further coaxially connected to a flywheel 46. The flywheel 46 is an inertial body having a predetermined inertia, also called a balance wheel, and it continues to rotate by virtue of the inertia even after the input to the hydraulic pump motor 22 is shut off. The hydraulic pump motor 22, the rotor 44 of electric generator 16, and the flywheel 46 are connected in a state with mechanically high rigidity, but there will arise no problem even if they are connected through a mechanism of disconnecting them by a clutch or the like.

An oil path (first oil path) 50 is connected between an outlet port 48 of the hydraulic pump 20 and an inlet port 54 of a hydraulic pump motor 52. The hydraulic pump motor 52 is also of the constant-volume one-directional rotation type as the aforementioned hydraulic pump motor 22 was, and the hydraulic pump motor 52 is arranged to rotate its rotary shaft 56 under feed of the operating oil through the inlet port 54 and is able to suck in the operating oil through the inlet port 54 with rotation of the rotary shaft 56 and to discharge the operating oil from its outlet port 58. A flywheel 60 as an inertial body is connected to the rotary shaft 56 of this hydraulic pump motor 52.

The outlet port 58 of the hydraulic pump motor 52 and the inlet port 38 of the hydraulic pump motor 22 are in communication with each other through an oil path 62. An unloading oil path 64 is branched from the middle of the oil path 62 and is connected to an oil tank 66. An on-off valve 68 is inserted in this unloading oil path 64. The on-off valve 68 is controlled to open and close by a control signal from a controller 70.

The oil path 62 is provided with a check valve 74, an accumulator 76, and an on-off valve 78, which are located in order on the downstream side with respect to a branch point 72 of the unloading oil path 64. The check valve 74 is arranged to prevent the operating oil from flowing from the accumulator 76 side via the unloading oil path 64 to the oil tank 66. The accumulator 76 is able to receive the operating oil fed under pressure from the hydraulic pump motor 52 side to store energy. The on-off valve 78 is arranged to be controlled to open and close by the controller 70.

An oil path 80 connected to an oil tank 66 is branched from the oil path 62 between the on-off valve 78 and the hydraulic pump motor 22. A check valve 82 is inserted in this oil path 80 to prevent the operating oil from flowing from the oil path 62 to the oil tank 66, and with the on-off valve 78 being in a closed state, the check valve 82 permits the operating oil to be sucked in from the oil tank 66 through the inlet port 38 of the hydraulic pump motor 22.

An oil path 84 to an oil tank 66 is connected to the outlet port 42 of the hydraulic pump motor 22.

Here the nacelle 24 supporting the propeller type windmill 14 is desirably as light as possible, because it horizontally rotates on the upper part of the support 28, depending upon wind directions. In consideration of maintenance and others, only the hydraulic pump 20 as a principal component is preferably disposed in the nacelle 24 and this inevitably results in disposing the hydraulic pump motor 22, the on-off valve 68, the check valve 74, the electric generator 16, etc. on the foundation 26. For this reason, the oil path 50 between the on-off valve 68 and, the windmill 14 and the hydraulic pump 20 in the nacelle 24 as the oil pressure source needs to have at least a length equal to or greater than the height of the support 28. By intensively placing the hydraulic pump motor 52, the on-off valve 68, the check valve 74, etc. and the oil paths connecting them, at appropriate positions on the foundation 26, the branch point 72 part of the oil path 62 and the unloading oil path 64 can be shorter than the oil path 50.

In the wind power generator 12 as described above, for starting power generation from a windless state in which the windmill 14 is not rotated, a generation start switch (not shown) of the wind power generator 12 is first turned on, whereupon the controller 70 generates control signals to close the on-off valve 78 and to open the on-off valve 68. It is assumed that the oil tanks 34, 66 and all the oil paths are filled with sufficient amount of the operating oil at the start of power generation and that during operation an operating oil supply (not shown) properly supplies the operating oil so as to avoid vacancy of the oil tank 34.

As wind starts blowing to rotate the windmill 14 and rotate the rotary shaft 18 of the hydraulic pump 20, the operating oil is sucked from the oil tank 34 into the hydraulic pump 20 and is discharged therefrom. Then the operating oil passes through the oil path 50 to flow into the inlet port 54 of the hydraulic pump motor 52 to rotate the rotary shaft 56 of the hydraulic pump motor 52. On this occasion, the operating oil flows out of the outlet port 58 of the hydraulic pump motor 52 and then flows from the oil path 62 through the unloading oil path 64 into the oil tank 66. Since the on-off valve 68 in the unloading oil path 64 is in an open state, the load on the hydraulic pump 20 and on the hydraulic pump motor 52 is smaller than during power generation, and the windmill 14 is readily accelerated by that degree. The rotation of the flywheel 60 connected to the rotary shaft 56 of the hydraulic pump motor 52 is also accelerated with the acceleration of the windmill 14 to store energy.

Thereafter, the controller 70 issues a control signal to the on-off valve 68 to switch it into a closed state, whereupon the operating oil discharged from the hydraulic pump motor 52 flows into the accumulator 76 to be accumulated. On this occasion, a torque generated by the hydraulic power fed to the inlet port 54 and the kinetic energy stored in the flywheel 60 is applied to the hydraulic pump motor 52, and a high pressure over the discharge pressure of the hydraulic pump 20 driven by the torque outputted from the driving source is generated according to the load pressure on the downstream side of the check valve 74, in the oil path 62 between the outlet port 58 of the hydraulic pump motor 52 and the check valve 74 and in the unloading oil path 64 from the branch point 72 to the on-off valve 68. In other words, if the load pressure downstream of the check valve 74 is higher than the discharge pressure of the hydraulic pump 20, the windmill (driving source) 14 driving the hydraulic pump 20 cannot maintain its rotation under ordinary circumstances. However, the shortage is compensated for by a torque generated from the kinetic energy of the inertial body 60 connected to the hydraulic pump motor 52, whereby the hydraulic pump motor 52 generates the discharge pressure enough to feed the operating oil against the high load pressure. Then the opening and closing operations of the on-off valve 68 are repeated (or switched) at appropriate timings, whereupon the operating oil at high pressure is continuously fed into the accumulator 76 to raise the pressure in the accumulator 76, in combination with the closing of the on-off valve 78.

Let us suppose herein that while the windmill 14 is rotating at a constant speed, the torque outputted by the windmill 14 is denoted by Qm. The hydraulic pump motor 52 is driven by the hydraulic power from the hydraulic pump 20 driven by this drive torque (Qm). It can be easily understood that, where Qp stands for the drive torque generated by the hydraulic pump motor 52, Qp=Qm, provided that the on-off valve 68 is in an open state and the losses in the hydraulic circuit system, the mechanical system, etc. are ignored. On the other hand, the energy outputted from the hydraulic pump motor 52 is stored as the kinetic energy $(\frac{1}{2}) \cdot I \cdot \omega^2$ of the flywheel 60. When the on-off valve 68 is switched into a closed state, the hydraulic pump motor 52 is subjected to a load, whereby the amount of oil from the hydraulic pump 20 is reduced and the rotational speed of the rotary shaft 56 of the hydraulic pump motor 52 is reduced. However, since the inertial torque of the flywheel 60, $I \cdot d\omega/dt$, is added, the relation of $Qp=Qm-I \cdot d\omega/dt$ holds, so that the discharge pressure of the hydraulic pump motor 52 increases according to the load pressure. This relation is equivalent to that in the conventional configuration wherein the hydraulic pump, the inertial body, and the driving source are integrated (cf. FIG. 1).

Incidentally, the branch point 72 part of the oil path 62 and the unloading oil path 64 are short and can be constructed of pipes with high rigidity such as steel pipes, as described above. Therefore, even if there occur such pressures as repetitions of high and low pressures by the switching control of on and off of the on-off valve 68, losses due to expansion and contraction of the pipe paths and frictional losses of the pipe paths can be reduced to the extent that the branch point 72 part of the oil path 62 and the unloading oil path 64 are shorter. Accordingly, energy is accumulated at a desired high pressure in the accumulator 76. On the other hand, only the discharge pressure of the hydraulic pump 20 acts on the oil path 50.

This discharge pressure can be assumed to become maximum at the maximum wind speed of wind on the windmill 14 from the viewpoint that the wind energy is high at that moment, but even the maximum discharge pressure is lower than the pressure that can be generated in the oil path 62 or the like. It is also possible to perform a control to generate only a low pressure. In terms of the magnitude of the moment of inertia of the windmill 14, the fluctuation velocity of the discharge pressure is smaller than the fluctuation velocity of fluctuations of the pressure caused by the switching control to open and close the on-off valve 68 and the on-off valve 78. The pulsation of the discharge pressure outputted from the hydraulic pump motor 52, which is caused by switching of the on-off valve 68, does not affect the upstream of the hydraulic pump motor 52, i.e., the oil path 50. Therefore, even in cases where the oil path 50 is longer than the oil path of the branch point 72 part or where the oil path is constructed of a rubber hose or the like, the expansion and contraction of the tube path is small and a drop of efficiency due to repetition of expansion and contraction is extremely small.

When the pressure of the accumulator 76 reaches a predetermined value, the on-off valve 78 is opened, whereupon the operating oil flows through the oil path 62 to the hydraulic pump motor 22. As the operating oil is supplied to the hydraulic pump motor 22, the rotary shaft 40 of the hydraulic pump motor 22 rotates to rotate the rotor 44 of the electric generator 16. Even if the pressure (load pressure) necessary for driving of the hydraulic pump motor 22 is higher than the discharge pressure of the hydraulic pump 20, the high pressure can be generated from the hydraulic pump motor 52 by use of the kinetic energy of the flywheel 60 as described above. Therefore, by preliminarily determining the kinetic energy of the flywheel 60 according to the load pressure, it also becomes feasible to drive the hydraulic pump motor 22. As the hydraulic pump motor 22 is driven in this manner to drive the electric generator 16, power generation is started.

Since the hydraulic pump motor 52 with inertia is placed between the on-off valve 68 and the hydraulic pump 20 and in the vicinity of the on-off valve 68, as described above, the high pressure can be efficiently extracted even in cases where the distance is long between the windmill 14 for driving the hydraulic pump 20, i.e., the driving source, and the on-off valve 68 or where the oil path of a rubber hose or the like needs to be used there, because of the layout. This hydraulic pump motor 52 functions like a capacitor in an electric circuit wherein the capacitor is disposed in the vicinity of a load to supply a stable voltage to the load where the distance is long between a power supply and the load.

An effective way is such that the controller 70 automatically controls the on-off valves 68, 78, based on signals from a pressure sensor 88 for detecting the pressure in the accumulator 76, an unrepresented revolution meter for detecting the number of revolutions of the flywheel 60, and so on. In FIG. 2, the sensor, an oil path 90 to communicate the inlet port 54 of the hydraulic pump motor 52 with an oil tank 66, and a check valve 92 inserted therein are provided for continuously supplying the operating oil to the hydraulic pump motor 52 to assure continuous power generation even if the rotation of the windmill 14 stops during rotation of the inertial body 60.

The preferred embodiment of the present invention was described above in detail, but the present invention is not limited to the above embodiment. For example, the above embodiment is an application of the present invention to the wind power generator, and the hydraulic system of the present invention can also be commonly applied to other applications; in such cases the load to which the operating oil is supplied can be one except for the hydraulic pump motor.

Figure 3:
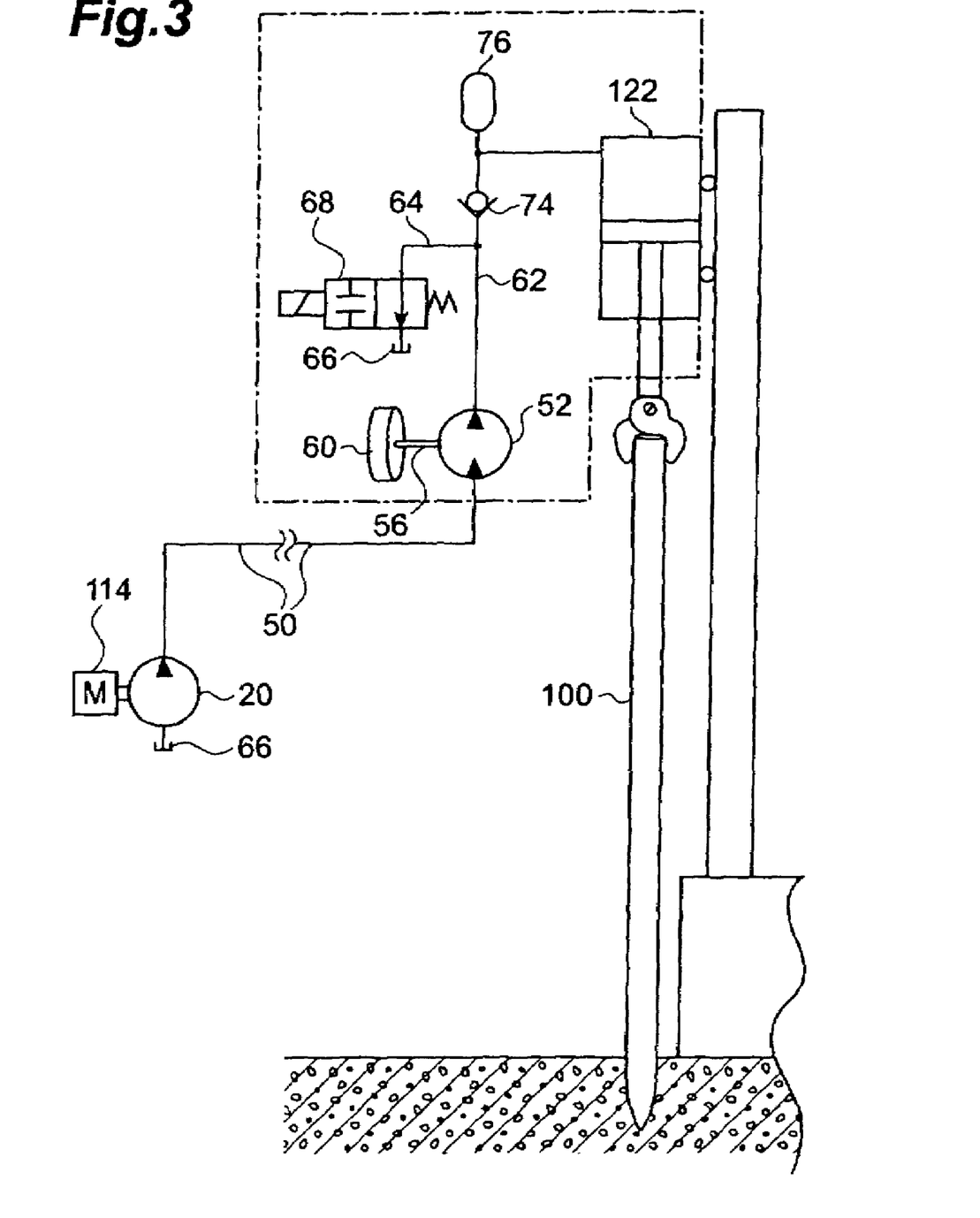
FIG. 3 is a hydraulic circuit diagram showing a case where a hydraulic system according to the present invention is applied to a press-in pile driver.
Figure 4:
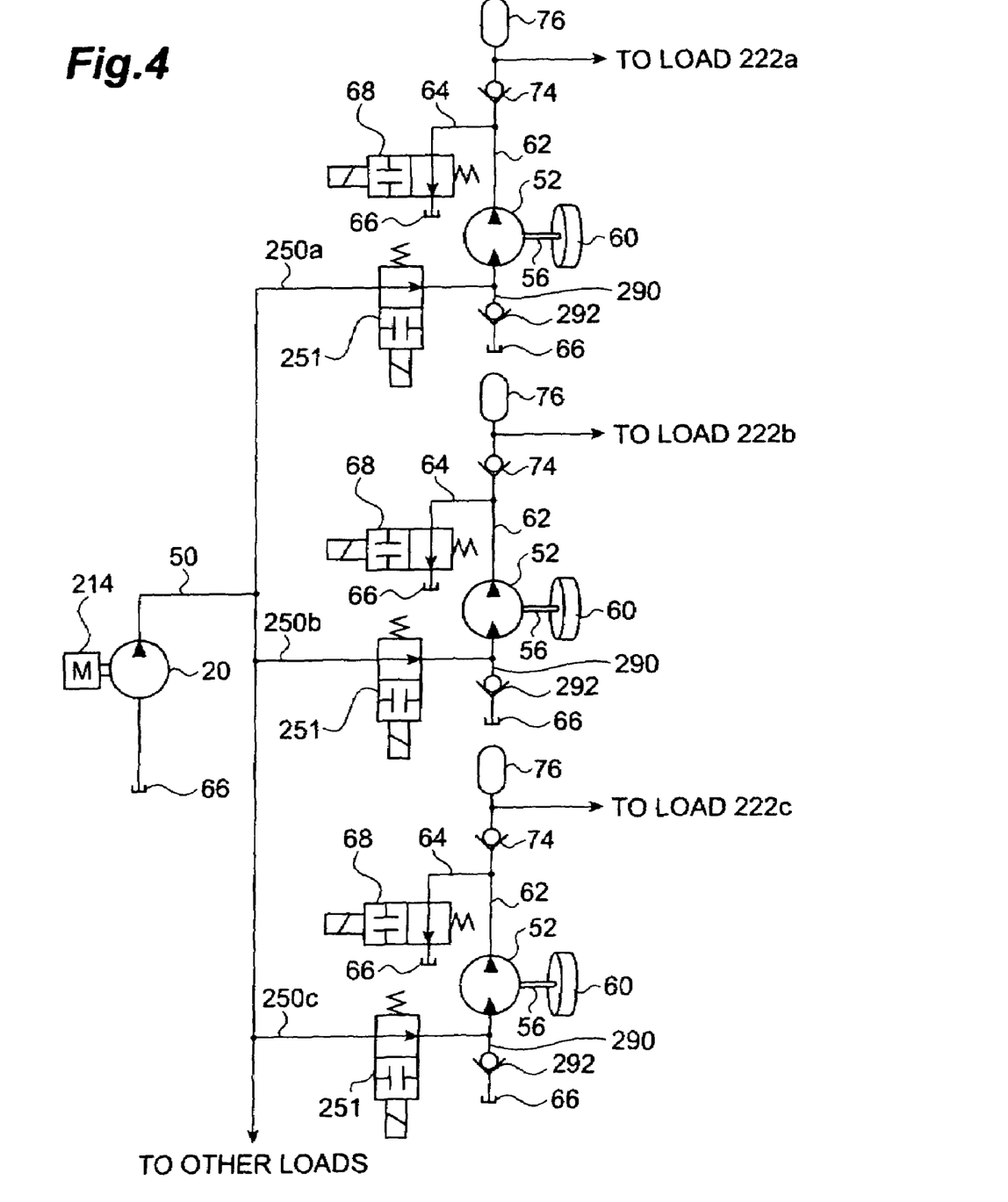
FIG. 4 is a hydraulic circuit diagram showing a hydraulic system according to the present invention in a case where there are a plurality of loads.

For example, as shown in FIG. 3, the present invention can be effectively applied to a press-in pile driver. In the case of the pile driver, a hydraulic cylinder (load) 122 for driving a pile 100 is sometimes far from a driving source 114 such as an electric motor or an internal combustion engine, but the hydraulic pump motor 52, the on-off valve 68, the check valve 74, the accumulator 76, etc. can be disposed in the vicinity of the hydraulic cylinder 122, as described above.

Where there are a plurality of loads to be individually controlled (e.g., a hydraulic cylinder for mold clamping, a hydraulic cylinder for supply of molten resin, etc. in one injection molding machine), a configuration as shown in FIG. 4 can be adopted. As seen from FIG. 4, there is only one oil pressure source, i.e., a driving source 214 and a hydraulic pump 20 for a plurality of loads 222a, 222b, 222c, . . . A hydraulic pump motor 52 with a flywheel 60 and components thereafter are provided for each of the loads 222a, 222b, 222c, . . .

In this configuration, the hydraulic power from the oil pressure source 214, 20 is distributed to the hydraulic pump motors 52 through respective branch oil paths 250a, 250b, 250c, . . . branched from an oil path 50. After the hydraulic pump motors 52 are driven by the distributed hydraulic power, hydraulic circuits associated with the respective hydraulic pump motors 52 are controlled independently of each other to enable hydraulic control of driving of the associated loads 222a, 222b, 222c, . . . Since this configuration requires only one driving source 214, the installation space for the driving source can be reduced, which provides the effect of expanding the applicability of the present invention.

The system may also be effectively so arranged, as shown in FIG. 4, that an on-off valve 251 is inserted in each of the branch oil paths 250a, 250b, 250c, . . . and that the on-off valves are individually controlled to control supply and stop of the operating oil to the respective hydraulic pump motors 52. In this configuration, in order to maintain the rotation of the inertial body 60 at the associated hydraulic pump motor 52 even with one of the on-off valves 251 being closed, an oil path 290 with a check valve 292 is preferably connected to an inlet port of each hydraulic pump motor 52 so as to supply the operating oil to each hydraulic pump motor 52.

Figure 5:
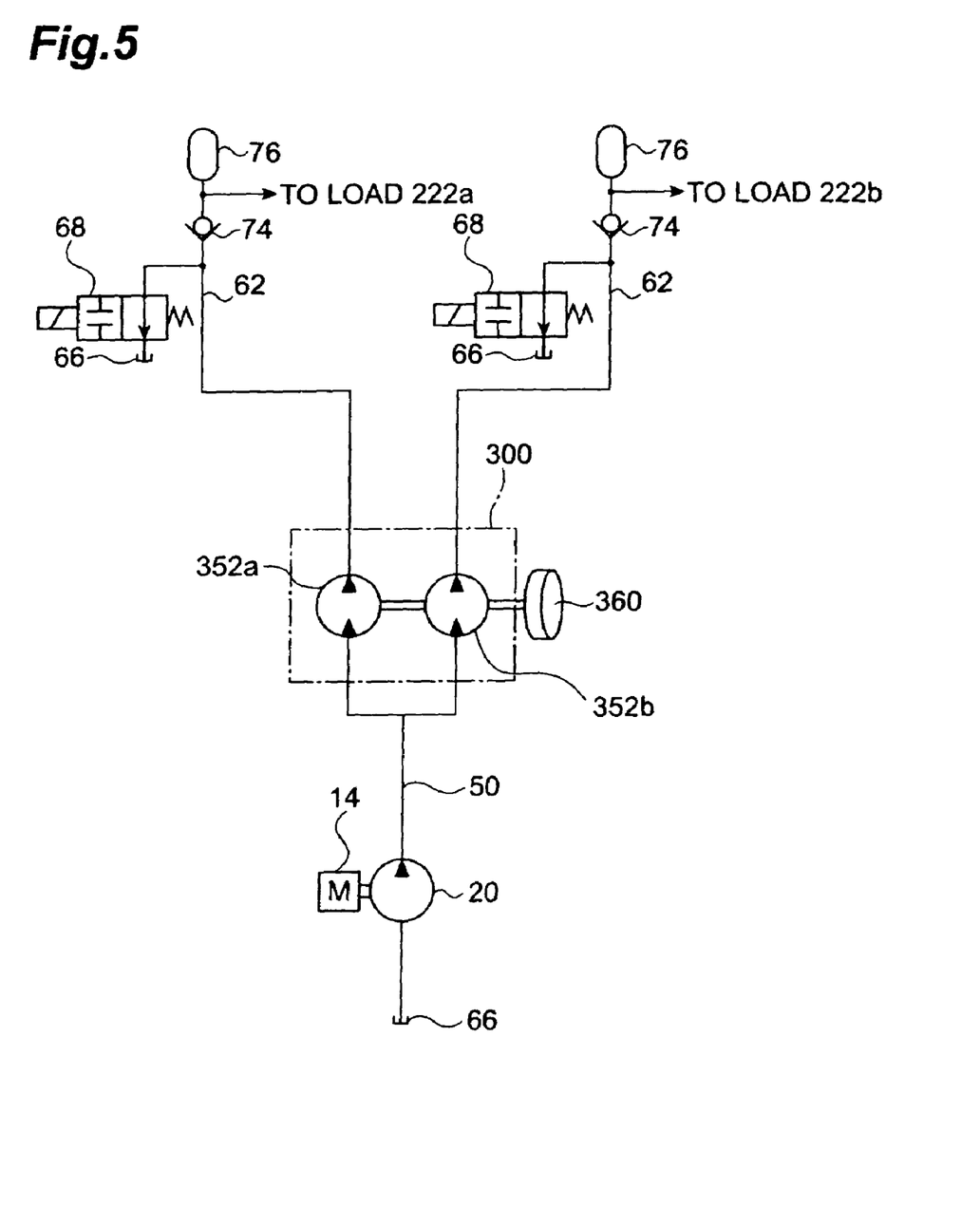
FIG. 5 is a hydraulic circuit diagram showing another embodiment of a hydraulic system according to the present invention in a case where there are a plurality of loads.

Furthermore, another conceivable configuration with a plurality of loads is one as shown in FIG. 5. In this configuration, hydraulic pump motors 352a, 352b are arranged as many as loads 222a, 222b, but there is only one flywheel 360 as an inertial body shared by the both hydraulic pump motors 352a, 352b. In this configuration, the loads 222a, 222b can also be individually controlled. The hydraulic pump motors 352a, 352b constitute a so-called flow divider 300. Namely, the hydraulic pump motors 352a, 352b are coupled by a common rotary shaft, and when the operating oil flows from the hydraulic pump 20 into each of the hydraulic pump motors 352a, 352b, they are rotated at the same number of revolutions and thus the operating oil flows at the same flow rate out of each of the hydraulic pump motors 352a, 352b.

Furthermore, it is also possible to adopt a configuration for delivering the generated high pressure to the load, without provision of the accumulator.

INDUSTRIAL APPLICABILITY

As described above, the present invention provides the effect of achieving high hydraulic efficiency, similar to that by the hydraulic system disclosed in Laid-Open No. 2003-130006, and also provides the effect of increasing degrees of freedom for the instrument layout as a result of using the hydraulic power as the power for rotating the inertial body and separating the inertial body from the driving source.

The present invention also enables driving of multiple loads by one driving source. Therefore, the scope of application and usage of the hydraulic system of the present invention is dramatically expanded in comparison with the conventional similar apparatus, thereby contributing to industrial growth.

The invention claimed is:

1. A hydraulic system for supplying an operating oil to a predetermined load, comprising:

an oil pressure source capable of outputting a predetermined hydraulic power;

a first oil path one end of which is connected to the oil pressure source;

a hydraulic pump motor having an inlet port to which the other end of the first oil path is connected;

an inertial body connected to a rotary shaft of the hydraulic pump motor;

a second oil path one end of which is connected to an outlet port of the hydraulic pump motor;

an unloading oil path branched from the second oil path;

an on-off valve inserted in the unloading oil path;

a valve for preventing backflow of the operating oil to the unloading oil path, which is connected to the other end of the second oil path; and a third oil path extending from the valve and connected to the load; and a controller for controlling opening and closing of the on-off valve, wherein when the on-off valve is closed and a torque for driving the oil pressure source is smaller than a torque occurred by the pump motor, the controller is operative to exercise control for repeatedly switching the on-off valve so as to increase the discharge pressure of the pump motor and supply the oil from the pump motor toward the load.

2. The hydraulic system according to claim 1, wherein the oil pressure source is a hydraulic pump driven by a driving source.

3. The hydraulic system according to claim 1, wherein the load comprises a plurality of loads, wherein there are the hydraulic pump motor, the inertial body, the second oil path, the unloading oil path, the on-off valve, the valve for preventing backflow, and the third oil path provided for each of the plurality of loads, and wherein the oil pressure source comprises only one oil pressure source provided for the plurality of loads, and the first oil path is branched into oil paths as many as the loads, to be connected to inlet ports of the corresponding hydraulic pump motors.

* * * * *